Jan. 16, 1940.  F. H. McLAIN  2,187,325
CLOTHESLINE HOOK
Filed Nov. 30, 1938
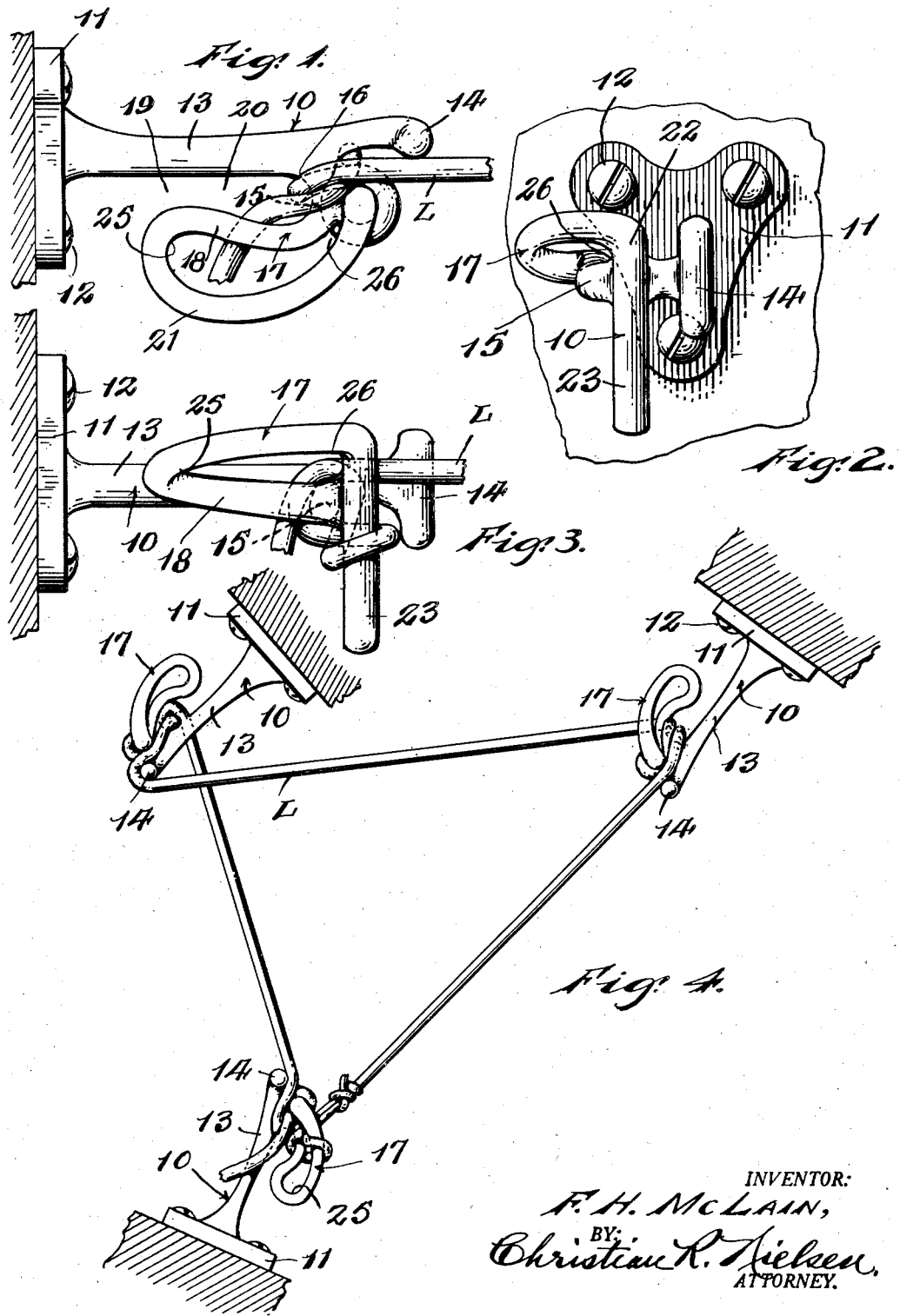
INVENTOR:
F. H. McLAIN,
BY Christian R. Nielsen
ATTORNEY.

Patented Jan. 16, 1940

2,187,325

UNITED STATES PATENT OFFICE 2,187,325

CLOTHESLINE HOOK

Fremont H. McLain, Wellsville, Ohio

Application November 30, 1938, Serial No. 243,254

3 Claims. (Cl. 24—131)

This invention relates to a supporting hook and particularly to hooks for support of a clothesline and the like, and it consists in the constructions, arrangements and combinations herein described and claimed.

It is an object of the invention to provide a hook of extreme simplicity both in manufacture and application in use.

It is also an object of the invention to provide a support means in which a pair of hook members are embodied between which a guide means is provided, making it possible to apply and secure a line or rope from various angles.

Additional objects, advantages and features of invention will appear from the following description considered in conjunction with the accompanying drawing, forming a part of this application, wherein Figure 1 is a top elevation of a hook constructed in accordance with my invention.

Figure 2 is a front view thereof.

Figure 3 is a side view of the hook shown in Figure 1.

Figure 4 is a top plan view illustrating a manner of supporting a cable from a plurality of hooks.

There is illustrated a hook 10 comprising a base 11, apertured at suitable points for reception of mounting screws 12 or other fastenings.

An arm 13 integrally formed with the base and extending at right angles therefrom is provided, the arm terminating in a double end bill 14. The bills 14 extend upwardly and downwardly from the longitudinal axis of the arm 13 and may be of any desired length.

Inwardly of the bills 14 a lateral extension 15 is integrally formed upon one side of the arm 13, the extension being of a length slightly greater than the diameter of the rope or cable to be secured, the forward edge 16 being slightly curved to present a smooth surface complemental to the contour of a rope.

Formed integrally with the extension there is a closed loop 17, slightly arcuate in top plane, the side 18 adjacent the arm 13 being slightly curved inwardly adjacent its free end as well as slightly upwardly, in the direction of the arm, thus providing a reduced entrance opening 19 to the slot 20. The side 21 of the loop is curved slightly upwardly in the direction of the extension 15 and is joined thereto by a short right angular portion 22, the latter being directed downwardly a substantial distance, providing a bill 23, extending in the same vertical plane as the bills 14.

By providing sides of the loop 17 as described, it will be seen that a substantial open bight portion 25 is provided at the free end thereof while at the other end a reduced bight 26 is formed, the loop 17 functions for securement of a rope as shown in Figure 4.

It will be apparent that a cable or rope may be secured upon a hook in many ways, this depending entirely upon the ingenuity of the user, but as shown in Figures 1 and 3, the line L is first passed through the entrance opening 19 so that the line rests in the forward edge 16, then back between bill 14 and bill 23, then a left hand wrap around bill 23, and thence right back over bill 23 at the right side of line L and finally passed downwardly through the opening 19, as clearly shown in Figure 1. Obviously, the line may be passed through the loop 17 from the lower side upwardly or downwardly and thence passed around the double bill 14 and the bill 23 and finally secured as shown in Figure 1 or otherwise as desired.

It should be noted also that the line may be passed to either side of the upper portion of the bill 14, as shown in Figure 4, with positive frictional binding of the line against loosening.

While I have shown and described specifically a preferred form of the invention and its manner of securement, this is illustrative only, and I consider as my own all such modifications in structure and application as fairly fall within the scope of the appended claims.

I claim:

1. A clothesline support hook comprising a base member having means for attachment to a supporting surface, an arm integrally formed therewith and projecting therefrom, said arm having right angularly disposed bill members, said arm further having an extension, a loop member carried by the extension and said loop member having a downwardly disposed bill member, said loop member having a free end disposed in the direction of the base member but spaced therefrom, defining an entrance passage-way.

2. A clothesline support hook comprising a base member having means for attachment to a supporting surface, an arm integrally formed therewith and projecting therefrom, said arm having right angularly disposed bill members, said arm further having an extension, a loop member carried by the extension and said loop member having a downwardly disposed bill member, said last named bill member being positioned adjacent the extension from the arm, said loop member having a free end disposed in the direction of the base member but stopping short thereof and spaced therefrom, defining a line entrance passage-way, said loop having an enlarged bight portion at its free end and a restricted portion adjacent its juncture with said extension.

3. The structure of claim 2 in which the portion of the loop next adjacent the arm lies in a plane below that of the outermost portion of the loop.

FREMONT H. McLAIN.